(12) United States Patent
Zhou

(10) Patent No.: US 10,241,719 B2
(45) Date of Patent: Mar. 26, 2019

(54) DYNAMIC GRANULARITY FOR STORAGE OPTIMIZATION

(71) Applicant: INTERNATIONAL BUSINESS MACHINES CORPORATION, Armonk, NY (US)

(72) Inventor: Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 15/193,441

(22) Filed: Jun. 27, 2016

(65) Prior Publication Data

US 2017/0371566 A1    Dec. 28, 2017

(51) Int. Cl.
G06F 3/06 (2006.01)
G06F 11/30 (2006.01)

(52) U.S. Cl.
CPC .......... G06F 3/0653 (2013.01); G06F 3/0608 (2013.01); G06F 3/0649 (2013.01); G06F 3/0685 (2013.01); G06F 11/3034 (2013.01)

(58) Field of Classification Search
CPC .......... G06F 12/00–12/16; G06F 3/06–3/0689
See application file for complete search history.

(56) References Cited

U.S. PATENT DOCUMENTS

| | | | |
|---|---|---|---|
| 2012/0278668 A1* | 11/2012 | Chiu | G06F 12/02 714/700 |
| 2014/0122776 A1 | 5/2014 | El Maghraoui et al. | |
| 2014/0208018 A1* | 7/2014 | Benhase | G06F 12/0866 711/113 |
| 2014/0229656 A1 | 8/2014 | Goss et al. | |
| 2015/0355837 A1* | 12/2015 | Bish | G06F 3/061 711/114 |

OTHER PUBLICATIONS

Yoon et al., "Adaptive Granularity Memory Systems: A Tradeoff Between Storage Efficiency and Throughput", Proceedings of ISCA'11 Jun. 4-8, 2011, pp. 1-12.
Fussell, "CESG Seminar: Automatic Granularity Control for Irregular Workloads on Heterogeneous Systems", University of Texas at Austin, Nov. 14, 2014, Abstract, p. 1.
Evaluator Group Inc., The Information Company for Storage Professionals, "Storage System Tiering", 2011, pp. 1-52.

* cited by examiner

*Primary Examiner* — Nicholas J Simonetti
(74) *Attorney, Agent, or Firm* — Richard A. Wilhelm

(57) ABSTRACT

A computer-implemented method, computer program product and system for dynamic granularity of a data storage by identifying tiers of data including units of data with a unit heat index, corresponding to an activity level metric and identifying a tier heat index for each of the tiers of data corresponding to an average of the unit heat index for the units of data within the tiers of data. Furthermore determining a granularity index based on a size of the units of data; calculating a pairing index by comparing the unit heat indexes from the corresponding tiers of data and calculating an efficiency index by comparing the unit heat indexes indicating a percentage of the of units of data within a first tier of data with a higher unit heat index than all of the units of data within a another tier of data with a lower tier heat index.

20 Claims, 7 Drawing Sheets

DYNAMIC GRANULARITY FOR STORAGE OPTIMIZATION

BACKGROUND

The present disclosure relates generally to the field of computer systems for storage optimization utilizing dynamic granularity and storage optimization.

Computer data storage, often called storage or memory, is a technology consisting of computer components and recording media used to retain digital data. It is generally knowns as a core function and fundamental component of computers. The central processing unit (CPU) of a computer manipulates data by performing computations. Storage tiering is the movement of data to different types of data storage drives or a different tier within the same disk based on the performance and capacity requirements. Tiering allows the majority of data to reside on slower, larger, cheaper drives—normally SATA—whilst most active data resides on the more performant and expensive drives, such as Fibre Channel and flash SSD.

A tiering computer system monitors array activity over a 24-hour period and generates a "heat map" that guides data migration to the most appropriate tier every 24 hours. When running in automatic mode, it is a fully automated process without a policy engine, which means the user must trust the array software to make decisions. A heat map is a workload activity metric that is calculated for each extent in a logical volume. The workload activity is expressed as a temperature gradient from hot (high activity) to cold (low activity). Use of the heat map transfer utility requires the tiering computer system monitoring function to be enabled at each of the primary and secondary storage systems involved in the heat map transfer.

The heat map transfer utility periodically transfers tiering computer system heat map information from primary to secondary storage systems. The secondary storage system generates migration plans based on the heat map data and (the secondary storage system's) current physical configuration. In this way, the performance characteristics of the secondary storage are consistently updated to reflect that of primary storage. Multiple secondary storage systems are supported. Alternatively, it is possible to have multiple primary storage systems that are associated with a single secondary storage system. It is recommended that the secondary storage system has the same physical configuration as the primary storage system. Secondary storage systems are then workload optimized based on primary storage system usage, with no performance penalties if data recovery is necessary.

SUMMARY

The present disclosure implements a system, method, and computer program product for optimizing a user-defined class. In an embodiment, the method includes identifying tiers of data, comprising units of data with a unit heat index corresponding to an activity level metric. The method include identifying a tier heat index for each of the tiers of data indicating an average of the unit heat indexes. The method includes determining a granularity index based on a size of the units of data. The method includes calculating a pairing index by comparing unit heat indexes within each of the tiers of data; the pairing index indicates a level of similarity of unit heat indexes within each the tiers of data. The method includes calculating an efficiency index by comparing unit heat indexes from different tiers of data; the efficiency index indicates a percentage of the units of data within a first tier of data with higher unit heat index than all of the units of data within a second tier of data. The method includes increasing the granularity index in response to the pairing index and the efficiency index satisfying a first criteria. Furthermore, the method includes decreasing the granularity index in response to the pairing index and the efficiency index satisfying a second criteria.

In another embodiment a computer program product for class loader optimizing is provided the computer program product includes identifying tiers of data, comprising units of data with a unit heat index corresponding to an activity level metric. The computer program include identifying a tier heat index for each of the tiers of data indicating an average of the unit heat indexes. The computer program includes determining a granularity index based on a size of the units of data. The computer program includes calculating a pairing index by comparing unit heat indexes within each of the tiers of data; the pairing index indicates a level of similarity of unit heat indexes within each the tiers of data. The computer program includes calculating an efficiency index by comparing unit heat indexes from different tiers of data; the efficiency index indicates a percentage of the units of data within a first tier of data with higher unit heat index than all of the units of data within a second tier of data. The computer program includes increasing the granularity index in response to the pairing index and the efficiency index satisfying a first criteria. Furthermore, the computer program includes decreasing the granularity index in response to the pairing index and the efficiency index satisfying a second criteria.

In another embodiment a computer system for class loader optimizing is provided the computer system includes identifying tiers of data, comprising units of data with a unit heat index corresponding to an activity level metric. The computer system include identifying a tier heat index for each of the tiers of data indicating an average of the unit heat indexes. The computer system includes determining a granularity index based on a size of the units of data. The computer system includes calculating a pairing index by comparing unit heat indexes within each of the tiers of data; the pairing index indicates a level of similarity of unit heat indexes within each the tiers of data. The computer system includes calculating an efficiency index by comparing unit heat indexes from different tiers of data; the efficiency index indicates a percentage of the units of data within a first tier of data with higher unit heat index than all of the units of data within a second tier of data. The computer system includes increasing the granularity index in response to the pairing index and the efficiency index satisfying a first criteria. Furthermore, the computer system includes decreasing the granularity index in response to the pairing index and the efficiency index satisfying a second criteria.

DETAILED DESCRIPTION

Figure 1A:
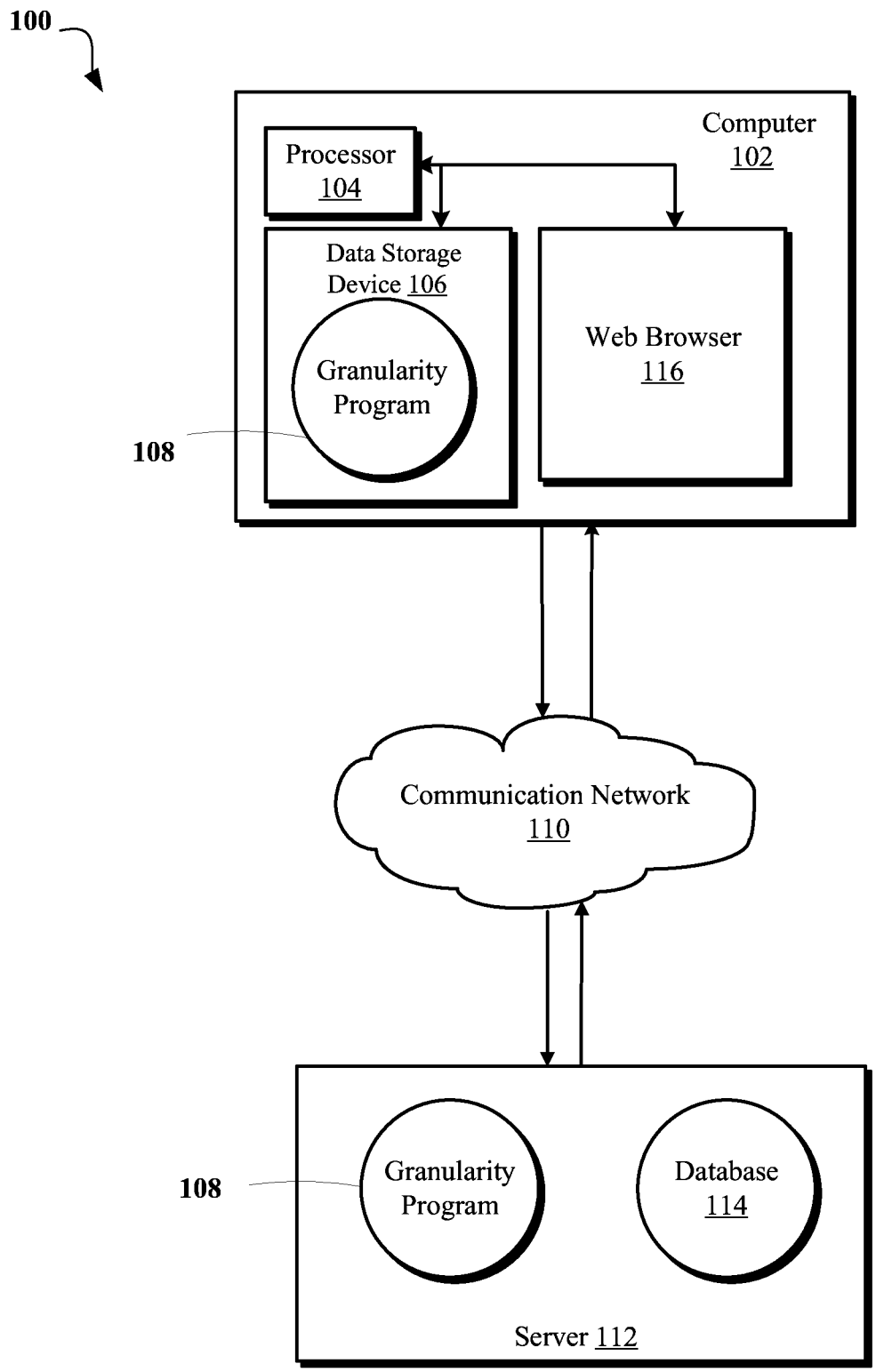
FIG. 1A is schematic block diagram depicting an exemplary computing environment for a Granularity program, in accordance with an aspect of the present disclosure.

FIG. 1A depicts a computing environment 100 for managing the display of application forms within a web-based application. In various embodiments of the present disclosure, the computing environment 100 may include a computer 102 and server 112 connected over communication network 110.

A computer 102 may include a processor 104 and a data storage device 106 that is enabled to run the granularity program 108 and a web browser 116 that may display an application form or a user interface for the user to work the granularity program 108. Non-limiting examples of a web browser may include: Firefox®, Explorer®, or any other web browser. All brand names and/or trademarks used herein are the property of their respective owners.

The computing environment 100 may also include a server 112 with a database 114. The server 112 may be enabled to run a program such as the granularity program 108. A communication network 110 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Communication network 110 may also include a number of different types of networks, such as, for example, an intranet, a local area network (LAN), or a wide area network (WAN).

It should be appreciated that FIG. 1A provides only an illustration of one implementation and does not imply any limitations with regard to the environments in which different embodiments may be implemented. Many modifications to the depicted environments may be made based on design and implementation requirements.

The computer 102 may communicate with the server 112 via the communication network 110. The communication network 110 may include connections, such as wire, wireless communication links, or fiber optic cables.

The computer 102 and the server 112 may be, for example, a mobile device, a telephone, a personal digital assistant, a netbook, a laptop computer, a tablet computer, a desktop computer, or any type of computing device capable of running a program and accessing a network. A program, such as the granularity program 108 may run on the computer 102 or on the server 112. It should be appreciated that granularity program 108 has the same component and operation methods regardless of whether it is run on the server 112 or computer 102. Therefore granularity program 108 applies to both granularity program 108 run on a computer 102 and granularity program 108 run on the server 112 are interchangeably used throughout this disclosure.

Figure 1B:
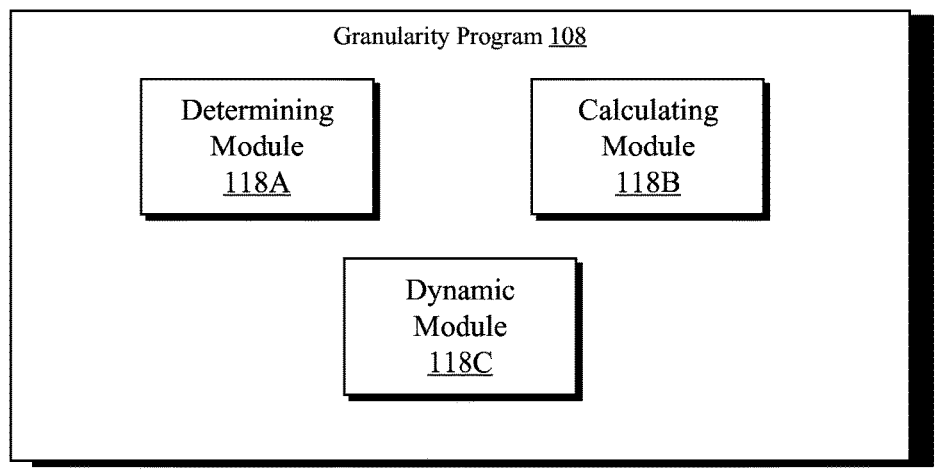
FIG. 1B is as schematic block diagram depicting components of a Granularity program, in accordance with an aspect of the present disclosure.

Referring now to FIG. 1B, different modules of granularity program 108 are depicted. In an embodiment, determining module 118A, may determine the existing heat index, different tiers and units of data within a tiered data system. Calculating module 118B may calculate a pairing index and efficiency index and determine whether the data system is efficient and the dynamic module 118C may increase or decrease the granularity index for the data system.

Figure 2A:
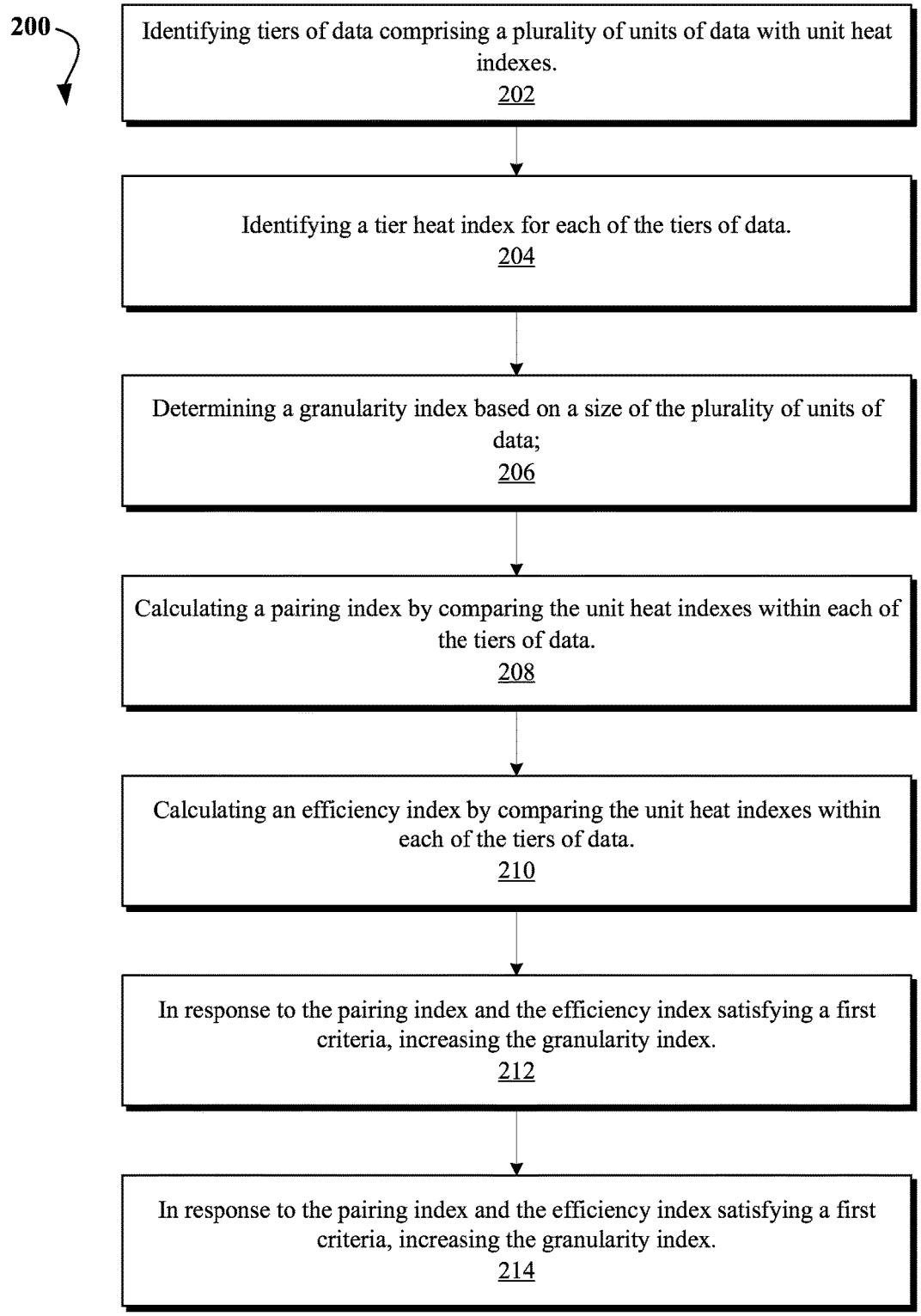
FIG. 2A is a flowchart depicting operational steps of a method for a Granularity program, in accordance with an embodiment of the present disclosure.

Referring now to FIG. 2A a flowchart depicting operational steps of a method for the granularity program 108 is illustrated in accordance with an embodiment of the present invention. Steps of method 200 (in conjunction with FIG. 2B and FIGS. 3A-B) may be implemented using one or more modules of a computer program, for example, granularity program 108, and executed by a processor of a computer, such as computer 102. It should be appreciated that FIG. 2A does not imply any limitations with regard to the environments or embodiments which may be implemented. Many modifications to the depicted environment or embodiment shown in FIG. 2A may be made.

At step 202, determining module 118A, may identifying a tiers of data within a data storage structure comprising units of data having a unit heat index. Determining module 118A may use variety of existing technologies to determine different tiers of data. Many data structures, indicate these information and in one embodiment, determining module 118A may use these indications in order to identify and determine different tier of data within the data structure. It must be noted that present disclosure may only be applicable for a data storage system which utilizes data tiering. In an embodiment, a tier of data consists of different paired data units and categorized or prioritized or both. Each of the data units within the tiers of data may correspond to any computer activity. For example, a tier of data may correspond to text, audio, or video files or a combination thereof. A unit heat index, is defined within the present disclosure, as a metric which corresponds to the activity level of a unit of data. In an embodiment, a data unit may have a heat index of 1 per month indicating that the unit data is accessed once a month. It follows logically that the hotter a unit of data, the more it is accessed and the colder a unit of data the less it is accessed.

Figure 2B:
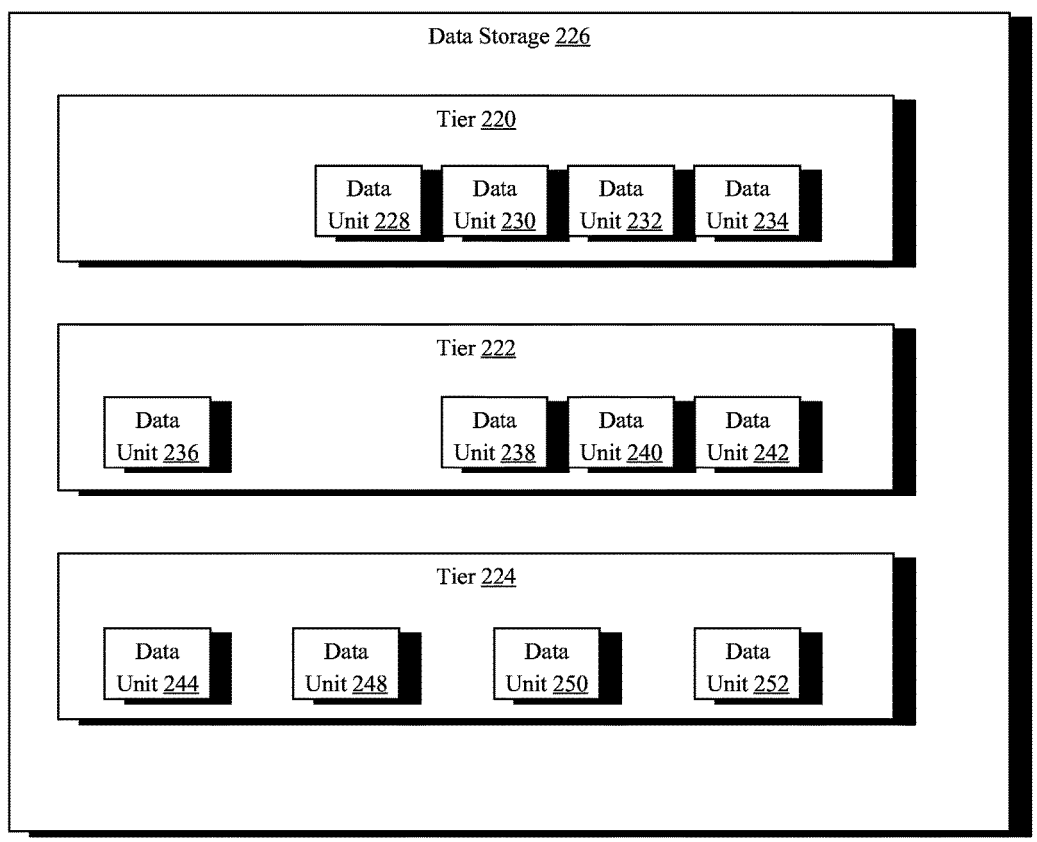
FIG. 2B is a schematic block diagram depicting a data storage with a tiering storage system, according to an embodiment of the present disclosure.

In the present embodiment, and as depicted in FIG. 2B, determining module 118A identifies a data storage system 226. Determining module 118A also identifies 3 tiers of data within the data storage system 226 (tier 220, tier 222, and tier 224). In the present embodiment, each of the tiers of data identified consists of different units of data. For example tier 220 consists of data units 228, 230, 232, and 234; tier 222 consists of data units 236, 238, 240, and 242; and tier 224 consists of data units 244, 248, 250, and 252.

It also must be appreciated that accessing the file refers to the ability to access or retrieve data stored within a database or other repositories. One who has data access can store, retrieve, move or manipulate stored data, which can be stored on a wide range of hard drives and external devices. Non-limiting examples of accessing data may include random access and sequential access. The sequential access may require information to be moved within the disk using a seek operation until the data is located. Each segment of data may have to be read one after another until the requested data is found. Reading data randomly may allow users to store or retrieve data anywhere on the disk, and the data is accessed in constant time. Oftentimes when using random access, the data is split into multiple parts or pieces and located anywhere randomly on a disk. A unit heat index is defined as user's random access to the data; in another embodiment unit heat index is determined by calculating a server's frequency of sequential access of a unit of data.

At step 204, determining module 118A may identify a tier heat index for each of the tiers of data. In an embodiment, determining module 118A may identify the tier heat index by calculating an average for the heat indexes of all the paired heat indexes within a particular tier of data. In another embodiment, a mean or median heat index may be used to determine the tier heat index. Furthermore, determining module 118A may also rank or identify an existing ranking system for the tiers of data. In the present embodiment, determining module 118A determines that tiers 220, 222, and 224 are already ranked based on their tier heat index. Tier 220 has a higher heat index than tier 222 and tier 222 has a higher tier index than tier 224.

At step 206, determining module 118A may determine a granularity index based on the size of the unit of data. Granularity index simply refers to the size of the unit of data. In the present embodiment, determining module 118A determines the granularity index of 1 GB.

In step 208, calculating module 118B may calculate a pairing index by comparing unit heat indexes within each of the tiers of data. In step 210, calculating module 118B may calculate an efficiency index by comparing the unit heat indexes within each of the tiers of data. Pairing indexes and heat indexes are thoroughly explained below within FIGS. 3A-3B.

In steps 212 and 214, dynamic module 118C may in response to pairing index and efficiency index satisfying a first or second criteria, increase or decrease the granularity index. The method and an embodiment to accomplish an increase or decrease of the granularity index is thoroughly explained in FIGS. 3A-B.

Referring now to FIG. 2B, FIG. 2B is a schematic block diagram depicting a data storage with a tiering storage system and flow chart depicted in FIG. 2A, according to an embodiment of the present disclosure. It should be appreciated that FIG. 2B does not imply any limitations with regard to the environments or embodiments which may be implemented. Many modifications to the depicted environment or embodiment shown in FIG. 2B may be made. In the embodiment illustrated, data storage system 226 is a tiered storage system which includes three tiers of data (220, 222, and 224). As illustrated above, granularity program 108 (utilizing various modules as shown above), increases and/or decreases the granularity of the data storage system 226.

Figure 3A:
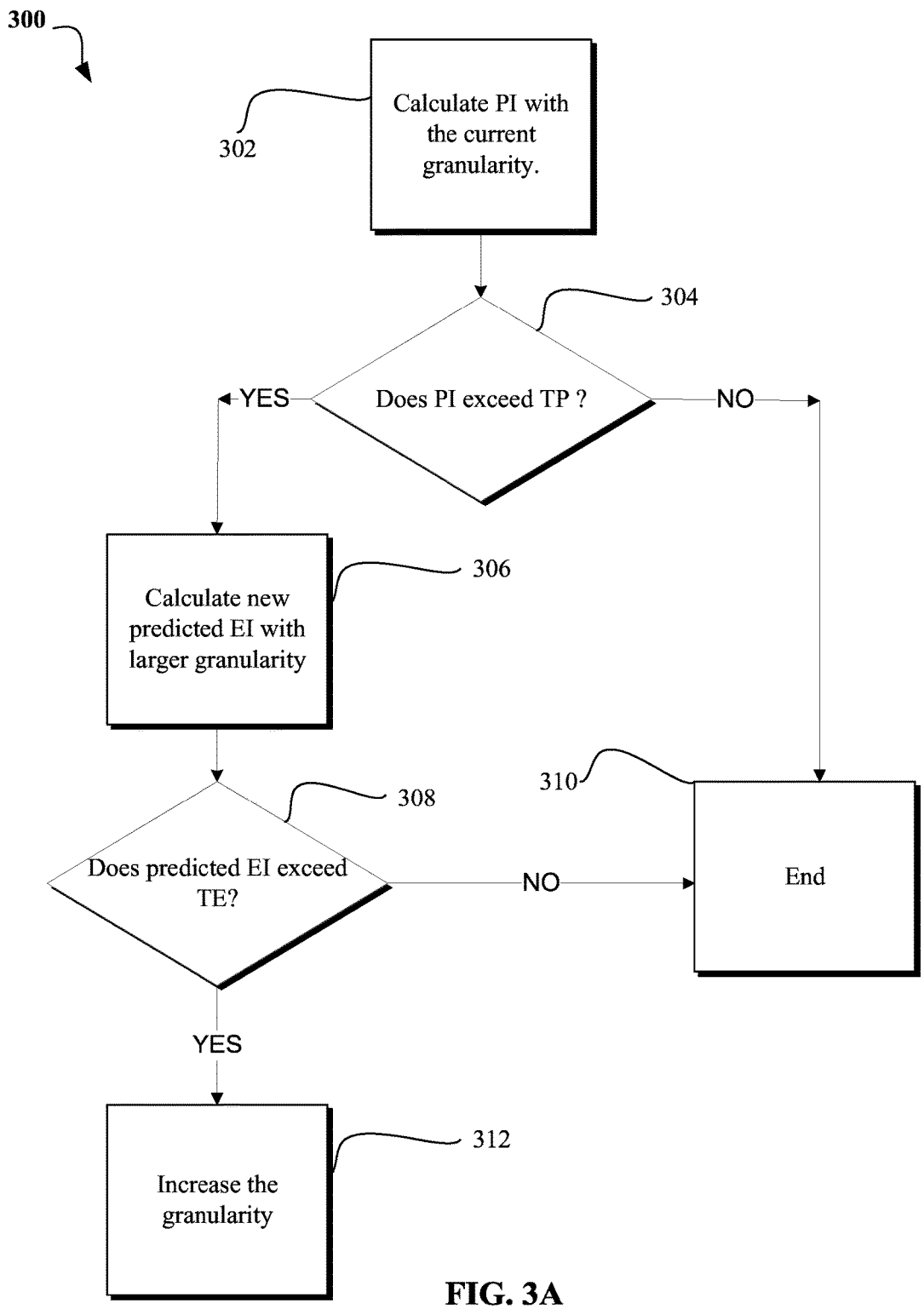
FIG. 3A is a flowchart diagram depicting a method to increase granularity, according to an embodiment of the present disclosure.

Referring now to FIG. 3A, FIG. 3A, is a flowchart diagram depicting a method to increase granularity, according to an embodiment of the present disclosure. Steps of method 300 (in conjunction with FIGS. 2A-B) may be implemented using one or more modules of a computer program, for example, granularity program 108, and executed by a processor of a computer, such as computer 102. It should be appreciated that FIG. 3A does not imply any limitations with regard to the environments or embodiments which may be implemented. In an embodiment, dynamic module 118C may perform method 300.

At step 302, dynamic module 118C, may calculate a Pairing Index (PI) with the current granularity of the data storage. Pairing index simply refers to a percentage of the data units on one tier of data which are paired. Being paired refers to two units of data being paired together in order to create a super-unit. When PI is at 100%, it could be inferred that all data units are paired within a particular tier. When PI is at 0%, it may logically be inferred that none of the data units are paired within the tier of data. In an embodiment, dynamic module 118C may calculate PI by dividing the number of unit in a tier (N) by a number of unit whose pair is also in the same tier (M) which is a smaller than the N value. In that embodiment the PI value is calculated by: PI=M/N. Values of M and N are known as a result of determining the granularity index within a data storage. In another embodiment, dynamic module 118C may determine the values of M and N separately by identifying paired and unpaired units of data within one or more tiers of any data storage.

In the present embodiment, dynamic module 118C identifies data units 228, 230, 232, and 234 as all being paired within tier 220. Dynamic module 118C calculates a 100% PI for tier 220. Dynamic module 118C also calculates a 75% PI value for tier 222 because data units 238, 240, 242 are paired and data unit 236 as not being paired. Dynamic module 118C also calculates a 0% PI value for tier 224.

At step 304, dynamic module 118C may compare the PI value to a PI threshold (TP). In an embodiment, granularity program 108 may receive a threshold from a use or another program. The threshold may also be a pre-determined value which may or may not indicate a dynamic value. In that embodiment, the threshold may change based on variety of factors such as the number of tiers of information or any other pre-defined/pre-determined factor indicated by the user. In another embodiment, user may input a range of threshold and indicate a lower and upper range of a threshold for PI. If PI exceeds TP, dynamic module may perform step 306; on the other hand if PI does not exceed TP, then dynamic module may end the calculation and not increase the granularity (step 310).

At step 306, dynamic module 118C may calculate a predicted Efficiency index (EI) value. EI value is used to measure the efficiency of the optimization given a granularity. The higher EI value, the more efficient the optimization. In an embodiment, EI may be defined practically by asking: if the granularity is decreased, what percentage of the sub-units in a tier of data will be hotter than the sub units within a lower tier of data. A sub-unit of data is defined as a unit of data which will be used to do monitoring and migration with smaller granularity. It logically follows that when EI=100% rate and granularity decreased, the same data (sub-units) will remain on the same tier of data. On the other hand, when EI=0%, and granularity decreased, none of the sub-unit will remain on the same tier of data. In an embodiment, EI is calculated by M/N where N represents a value obtained by randomly picking 5% (or 10% or another user-defined or adjusted number in other embodiments) number of sub-units from a higher tier of data and lower tier of data; calculating the $H_{Sub}$(the heat index corresponding to the data unit) of the randomly picked data units; and where M represents the number of sub-units which are in the higher tier of data using the current granularity.

Dynamic module 118C may also calculate a predicted EI value. In an embodiment the predicted EI value may be calculated by M/N where N represents a value obtained by randomly picking 5% (or 10% or another user-defined or adjusted number in other embodiments) number of super-units from a higher tier of data and higher tier of data; calculating the $H_{Sup}$ (the heat index corresponding to the data unit) of the randomly picked data units; and where M represents the number of super-units which are in the higher tier of data using a higher granularity. It is important to note that a $H_{Sup}$ denotes to a heat index of the granularity of the data system when the granularity is increased. For example $H_{Sup}$ may correspond to a 50% or a 200% increase to the granularity. This step, in an embodiment, is performed in order to avoid a ping pong case of increasing and decreasing the granularity. In short, this step may be performed to predict the heat index after the increase of the granularity in order to predict and avoid a ping pong case. For example of the $H_{Sup}$ is still not satisfactory, in an embodiment, granularity program 108, may not increase the granularity or may increase the granularity by a bigger percentage.

At step 308, the dynamic module may compare the Predicted EI value to a EI threshold (TE). In an embodiment, granularity program 108 may receive TE from a use or another program. In another embodiment, user may input a range of threshold and indicate a lower and upper range of a threshold for EI or predicted EI value. If the predicted EI value exceeds TE, dynamic module 118C may perform step 312; on the other hand if the predicted EI value does not exceed TE, then dynamic module 118C may end the calculation and not increase the granularity (step 310). At step 312, dynamic module 118C, in response to a predicted EI value exceeding a TE, may increase the granularity. In an embodiment, this increase may be 2005 (or a factor of 2).

Figure 3B:
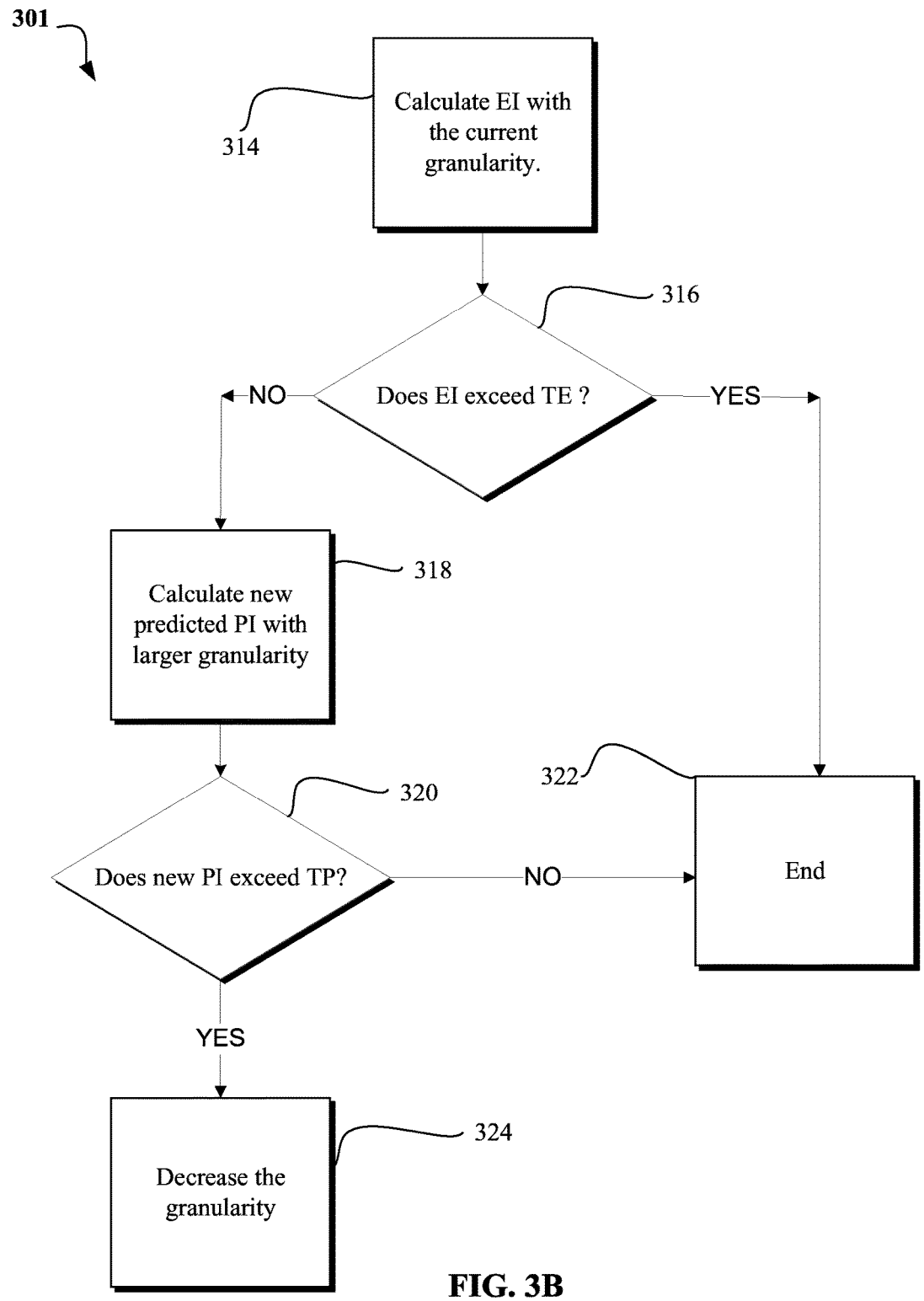
FIG. 3B is a flowchart diagram depicting a method to decrease granularity, according to an embodiment of the present disclosure.

Referring now to FIG. 3B, FIG. 3B, is a flowchart diagram depicting a method to decrease granularity, according to an embodiment of the present disclosure. Steps of method 301 (in conjunction with FIGS. 2A-B) may be implemented using one or more modules of a computer program, for example, granularity program 108, and executed by a processor of a computer, such as computer 102. It should be appreciated that FIG. 3B does not imply any limitations with regard to the environments or embodiments which may be implemented. In an embodiment, dynamic module 118C may perform method 301.

At step 314, dynamic module 118C, may calculate an Efficiency Index (EI) with the current granularity of the data storage. In an embodiment, dynamic module 118C may use the same method(as discussed above) to calculate EI with the current granularity.

At step 316, dynamic module 118C may compare the EI value to a EI threshold (TE). In an embodiment, granularity program 108 may receive a threshold from a use or another program. In another embodiment, user may input a range of threshold and indicate a lower and upper range of a threshold for EI. If EI exceeds TE, dynamic module 118C may perform step 318; on the other hand if EI does not exceed TE, then dynamic module may end the calculation and not decrease the granularity (step 322).

At step 306, dynamic module 118C may calculate a predicted Pairing Index value. PI index has been thoroughly discussed in FIG. 3A. A predicted PI value, however is different than PI value. In an embodiment, dynamic module may calculate the predicted PI value by M/N where N represents a value obtained by randomly picking 5% (or 10% or another user-defined or adjusted number in other embodiments) number of sub-units from a higher tier of data and higher tier of data; calculating the $H_{Sub}$ (the heat index corresponding to the data unit) of the randomly picked data units; and where M represents the number of sub-units which are paired. $H_{Sub}$, in an embodiment, is used to avoid a ping pong case (similar to $H_{Sup}$).

At step 320, dynamic module 118C may compare the Predicted PI value to a PI threshold (TP). In an embodiment, granularity program 108 may receive TE from a use or another program. In another embodiment, user may input a range of threshold and indicate a lower and upper range of a threshold for PI or predicted PI value. If the predicted PI value exceeds TP, dynamic module 118C may perform step 312; on the other hand if the predicted PI value does not exceed PE, then dynamic module 118C may end the calculation and not increase the granularity (step 310). At step 324, Dynamic module 118C, in response to a predicted EI value exceeding a TE, may decrease the granularity.

Figure 4:
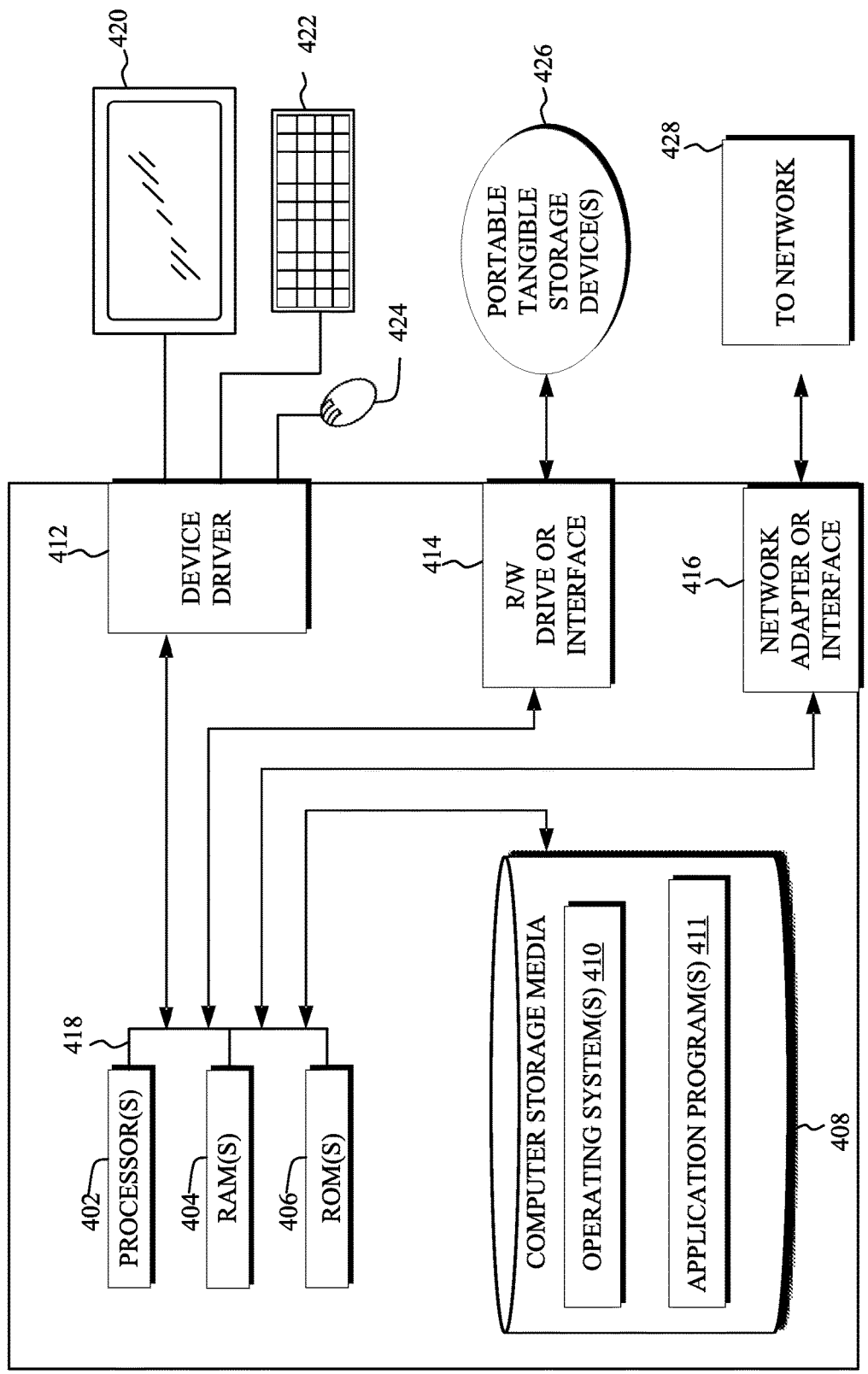
FIG. 4 is a block diagram of internal and external components of computers and servers depicted in FIG. 1, according an embodiment of the present disclosure.

Referring now to FIG. 4 components of a computer system, for example server 112 and data source 120, of computing environment 100 of FIG. 1, in accordance with an embodiment of the present disclosure.

Server 112 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 112 and computer 102 may also include an R/W drive or interface 414 to read from and write to one or more portable computer readable storage media 426. Application programs 411 on server 112 and computer 102 may be stored on one or more of the portable computer readable storage media 426, read via the respective R/W drive or interface 414 and loaded into the respective computer readable storage media 408.

Server 112 may also include a network adapter or interface 416, such as a TCP/IP adapter card or wireless communication adapter (such as a 4G wireless communication adapter using OFDMA technology). Application programs 411 on server 112 and may be downloaded to the computing device from an external computer or external storage device via a network (for example, the Internet, a local area network or other wide area network or wireless network generally network 428) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 112 and computer 102 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

While the present disclosure is particularly shown and described with respect to preferred embodiments thereof, it will be understood by those skilled in the art that changes in forms and details may be made without departing from the spirit and scope of the present application. It is therefore intended that the present disclosure not be limited to the exact forms and details described and illustrated herein, but falls within the scope of the appended claims.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present disclosure. Therefore, the present disclosure has been disclosed by way of example and not limitation.

The invention claimed is:

1. A computer-implemented method for dynamic granularity of a data storage, comprising:
identifying a plurality of tiers of data, each of the tiers of data comprising a plurality of units of data associated with a unit heat index corresponding to an activity level metric calculated for each of the units of data;
identifying a tier heat index for each of the plurality of tiers of data corresponding to an average of the unit heat index for the plurality of units of data within the corresponding plurality of tiers of data;
determining a granularity index based on a data size of the plurality of units of data;
calculating a pairing index by comparing the unit heat indexes from the corresponding plurality of tiers of data, the pairing index indicating a level of similarity of each of the unit heat indexes within each of the plurality of tiers of data; and
calculating an efficiency index by comparing the unit heat indexes of each of the units of data within the corresponding plurality of tiers of data, the efficiency index indicating a percentage of the plurality of units of data within a first tier of data with a higher unit heat index than all of the units of data within a second tier of data, wherein the first tier of data has a higher tier heat index than the second tier of data.

2. The method of claim 1, further comprising:
decreasing the granularity index by a pre-determined amount, in response to the pairing index and the efficiency index satisfying a first criteria.

3. The method of claim 2, wherein the pre-determined amount is 50% of the granularity index.

4. The method of claim 1, further comprising:
increasing the granularity index by a pre-determined amount, in response to the pairing index and the efficiency index satisfying a second criteria.

5. The method of claim 4, wherein the pre-determined amount is 200% of the granularity index.

6. The method of claim 1, wherein the pairing index corresponds to a percentage of the data units on one tier of data which are paired.

7. The method of claim 1, wherein the efficiency index is calculated by M/N where N represents a value obtained by randomly picking 5% of super-units from a higher tier and where M represents a number of super-units which are in the higher tier of data using a higher granularity.

8. A computer system for generating feedback for dynamic granularity of a data storage, the computer system comprising:
one or more computer processors;
one or more computer-readable storage media;
program instructions stored on the computer-readable storage media for execution by at least one of the one or more processors, the program instructions comprising:
instructions to identify a plurality of tiers of data, each of the tiers of data comprising a plurality of units of data associated with a unit heat index corresponding to an activity level metric calculated for each of the units of data;
instructions to identify a tier heat index for each of the plurality of tiers of data corresponding to an average of the unit heat index for the plurality of units of data within the corresponding plurality of tiers of data;
instructions to determine a granularity index based on a data size of the plurality of units of data;
instructions to calculate a pairing index by comparing the unit heat indexes from the corresponding plurality of tiers of data, the pairing index indicating a level of similarity of each of the unit heat indexes within each of the plurality of tiers of data; and
instructions to calculate an efficiency index by comparing the unit heat indexes of each of the units of data within the corresponding plurality of tiers of data, the efficiency index indicating a percentage of the plurality of units of data within a first tier of data with a higher unit heat index than all of the units of data within a second tier of data, wherein the first tier of data has a higher tier heat index than the second tier of data.

9. The computer system of claim 8, further comprising:
instructions to decrease the granularity index by a pre-determined amount, in response to the pairing index and the efficiency index satisfying a first criteria.

10. The computer system of claim 9, wherein the pre-determined amount is 50% of the granularity index.

11. The computer system of claim 8, further comprising:
instructions to increase the granularity index by a pre-determined amount, in response to the pairing Index and the efficiency index satisfying a second criteria.

12. The computer system of claim 11, wherein the pre-determined amount is 200% of the granularity index.

13. The computer system of claim 8, wherein the pairing index corresponds to a percentage of the data units on one tier of data which are paired.

14. The computer system of claim 8, wherein the efficiency index is calculated by M/N where N represents a value obtained by randomly picking 5% of super-units from a higher tier and where M represents a number of super-units which are in the higher tier of data using a higher granularity.

15. A computer program product for generating feedback for query execution, comprising a computer-readable storage medium having program code embodied therewith, the program code executable by a processor of a computer to perform a method comprising:
identifying a plurality of tiers of data, each of the tiers of data comprising a plurality of units of data associated with a unit heat index corresponding to an activity level metric calculated for each of the units of data;
identifying a tier heat index for each of the plurality of tiers of data corresponding to an average of the unit heat index for the plurality of units of data within the corresponding plurality of tiers of data;
determining a granularity index based on a data size of the plurality of units of data;
calculating a pairing index by comparing the unit heat indexes from the corresponding plurality of tiers of data, the pairing index indicating a level of similarity of each of the unit heat indexes within each of the plurality of tiers of data; and
calculating an efficiency index by comparing the unit heat indexes of each of the units of data within the corresponding plurality of tiers of data, the efficiency index indicating a percentage of the plurality of units of data within a first tier of data with a higher unit heat index than all of the units of data within a second tier of data, wherein the first tier of data has a higher tier heat index than the second tier of data.

16. The computer program product of claim 15, further comprising:
  decreasing the granularity index by a pre-determined amount, in response to the pairing index and the efficiency index satisfying a first criteria.

17. The computer program product of claim 15, further comprising:
  increasing the granularity index by a pre-determined amount, in response to the pairing index and the efficiency index satisfying a second criteria.

18. The computer program product of claim 17, wherein the pre-determined amount is 50% of the granularity index.

19. The computer program product of claim 15, wherein the pairing index corresponds to a percentage of the data units on one tier of data which are paired.

20. The computer program product of claim 15, wherein the efficiency index is calculated by M/N where N represents a value obtained by randomly picking 5% of super-units from a higher tier and where M represents a number of super-units which are in the higher tier of data using a higher granularity.

* * * * *